United States Patent [19]

Dubois

[11] Patent Number: 5,040,764

[45] Date of Patent: Aug. 20, 1991

[54] LOW FREQUENCY VIBRATION ABSORBER

[75] Inventor: Neil J. Dubois, Cranston, R.I.

[73] Assignee: The United States of America as represented by the Secretary of the Navy, Washington, D.C.

[21] Appl. No.: 590,183

[22] Filed: Sep. 28, 1990

[51] Int. Cl.⁵ ............................................. F16M 13/00
[52] U.S. Cl. ................................... 248/635; 248/603; 248/638
[58] Field of Search ............... 248/634, 635, 603, 604, 248/611, 612, 638; 267/141.1

[56] References Cited

U.S. PATENT DOCUMENTS

| | | | |
|---|---|---|---|
| 4,076,197 | 2/1978 | Dochterman | 248/604 |
| 4,597,555 | 7/1986 | Weihsmann | 248/604 X |
| 4,744,539 | 5/1988 | Stimeling | 248/638 |
| 4,765,758 | 8/1988 | O'Donnell et al. | 267/141.1 X |
| 4,805,868 | 2/1989 | Claude | 248/603 |
| 4,819,503 | 4/1989 | Fazi, Jr. et al. | 248/634 X |

Primary Examiner—Ramon O. Ramirez
Attorney, Agent, or Firm—Michael J. McGowan; Prithvi C. Lall; Michael F. Oglo

[57] ABSTRACT

A mounting assembly for absorbing low frequency vibrational energy as produced by a source and isolating a base member therefrom, the mounting assembly including a central metallic ring, non-metallic foam rings located on both sides of the central metallic ring in concentric relation with respect thereto, and inner and outer metallic ring members engaging said foam rings in concentric relation, the foam rings defining a spongy mass that effectively absorbs the low frequency vibrational energy emanating from the source.

8 Claims, 2 Drawing Sheets

LOW FREQUENCY VIBRATION ABSORBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a low frequency vibration absorber assembly, including a device which absorbs low frequency vibrational energy as produced by a source that is mounted on a base member, for substantially isolating said base member from the source of low frequency vibrational energy, and more particularly includes the use of a soft spongy material that is mounted between metallic members and that is distributed over a relatively large area, the large area of the soft material providing for the support of sizeable static loads. In addition, the soft spongy material, preferably in the form of a foam material, possesses the characteristic of absorbing a large amount of energy, thereby providing for the isolating of the base member from the source of vibrational energy.

(2) Description of the Prior Art

The present invention has particular application in preventing motor-induced vibrations in torpedoes from being transferred to the torpedo shell, and thereby prevents those vibrations from being radiated into the water. Prior to the instant invention, a multitude of motor-mount configurations have been utilized, and although some of these prior art devices have solved the vibration problem to some degree, the discrete mounts which were constructed of various rubbers, urethanes and other elastic materials, have not proved to be successful in application, particularly in the attenuation or absorption of low frequency vibrations as produced by the torpedo motors.

SUMMARY OF THE INVENTION

Accordingly, it is a general purpose and object of the present invention to provide an assembly for absorbing low frequency vibrational energy as produced by a source that is mounted on a base member for isolating the base member from the source of the low frequency vibrational energy.

It is a further object to provide an assembly for absorbing low frequency vibrational energy that includes at least one device that is defined by a central metallic ring member, nonmetallic foam rings located on both sides of the central metallic ring member in concentric relation with respect thereto, and outer metallic ring members engaging said foam rings in concentric relation.

Another object is to provide an assembly for absorbing low frequency vibrational energy that can be produced at a relatively low cost.

Still another object is to provide an assembly for absorbing low frequency vibrational energy to prevent motor-induced vibrations in torpedoes from being transferred to the shell thereof thereby preventing the radiation of the vibrations from the shell into the water in which the torpedo is moving.

The above-described objects are accomplished by the present invention by providing at least one annular member that is defined by a central metallic ring member, inner and outer nonmetallic foam rings being located on both sides of the metallic ring member in concentric relation with respect thereto, and inner and outer ring members engaging the foam rings in concentric relation. Inner mounting means interconnect the inner metallic ring member to the source of the low frequency vibrational energy, and outer mounting means interconnect the outer metallic ring member to the base member. The assembly thus absorbs the vibrational energy as produced by the source for substantially isolating the base member from the source. The foam rings as located in each of the devices that define the assembly of the subject invention are formed of a soft spongy material that is distributed over a relatively large area. The large area enables the soft material to support sizeable static loads, and in addition, the foam material possesses the characteristic of absorbing a large amount of energy, thereby increasing the performance of the assembly. By forming each of the assemblies in an annular construction, the surface area required for distributing the low frequency vibrational energy over the total volume of foam and thereby maximizing the isolation of the base member from the source of the low frequency vibrational energy is obtained.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENTS

Figure 1:
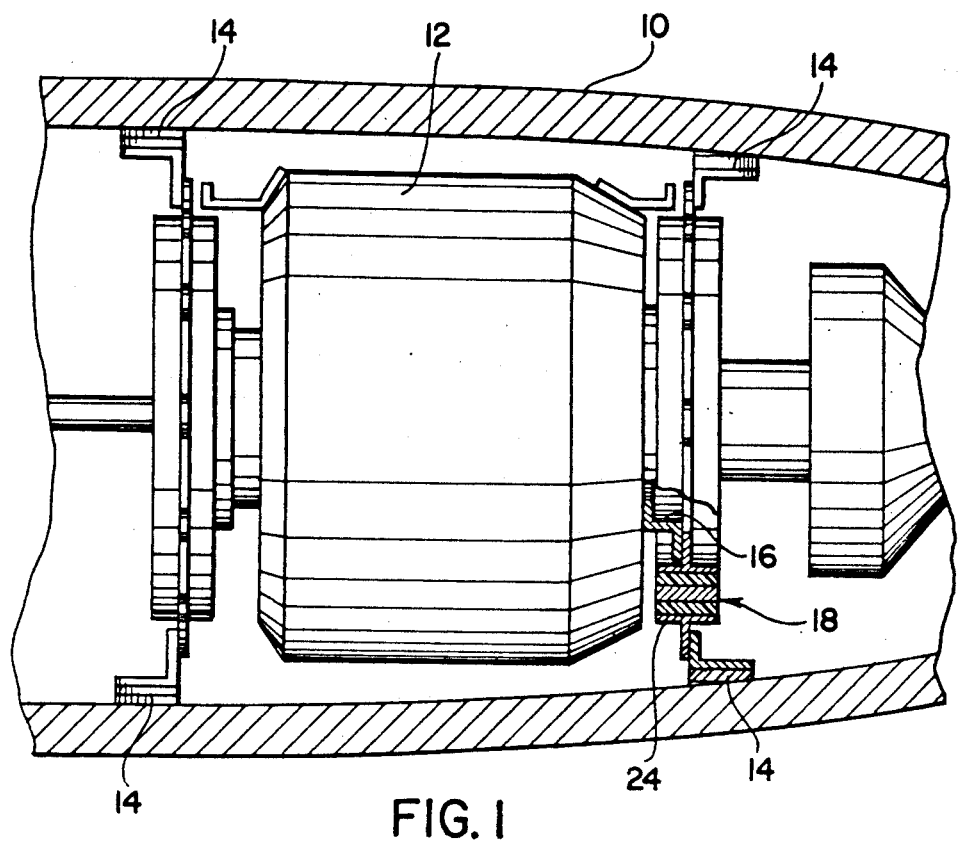
FIG. 1 is a partial cross-sectional view of a torpedo shell illustrating a torpedo motor mounted therein and further illustrating the low frequency vibrational energy absorbing assemblies of the subject invention as located between the motor and the shell a portion of an assembly being shown in section.
Figure 2:
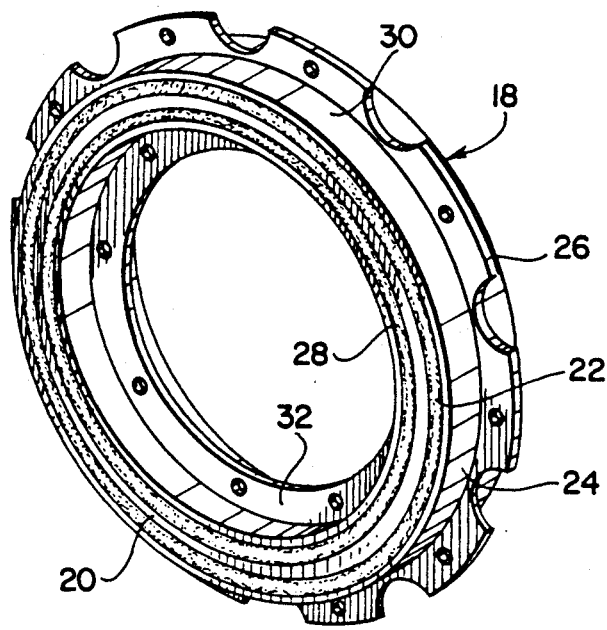
FIG. 2 is a perspective view of one of the assemblies of the subject invention for absorbing low frequency vibrational energy.

Referring now to the drawings, and particularly to FIG. 1, a portion of a torpedo shell is indicated at 10 and is illustrated in section. It is understood that the torpedo shell 10 as shown is only representative of an elongated tubular member of conventional design. Mounted within the tubular shell 10 is a motor 12, which as will be described, defines a source of induced vibrations that would normally tend to be transferred through the mounting connections thereof to shell 10 and thereafter radiated into the water in which the torpedo is moving. Supporting the motor 12 within the shell 10 at each end of the motor are mounting brackets 14 which are fixed to the interior of the shell 10 in any conventional manner. Interconnected to the mounting brackets 14 and also fixed to opposed annular stand-off flange members 16 of motor 12 are opposed mounting assemblies, one of which is generally indicated at 18. The manner of affixing assembly 18 to brackets 14 and flanges 16 is preferably by adhesive bonding but many other conventional fastening means may be used without deviating from the teachings herein. The assemblies 18 that are the subject matter of the present invention are generally designed to absorb low frequency vibrational energy such as that produced by the motor 12. Each of the mounting assemblies 18 are substantially similar, and one such assembly is shown in section in FIG. 1 and in enlarged form in FIG. 3. A mounting assembly 18 is also illustrated in perspective in FIG. 2, and reference hereafter with respect to the assembly 18 will be made to FIGS. 2 and 3.

Figure 3:
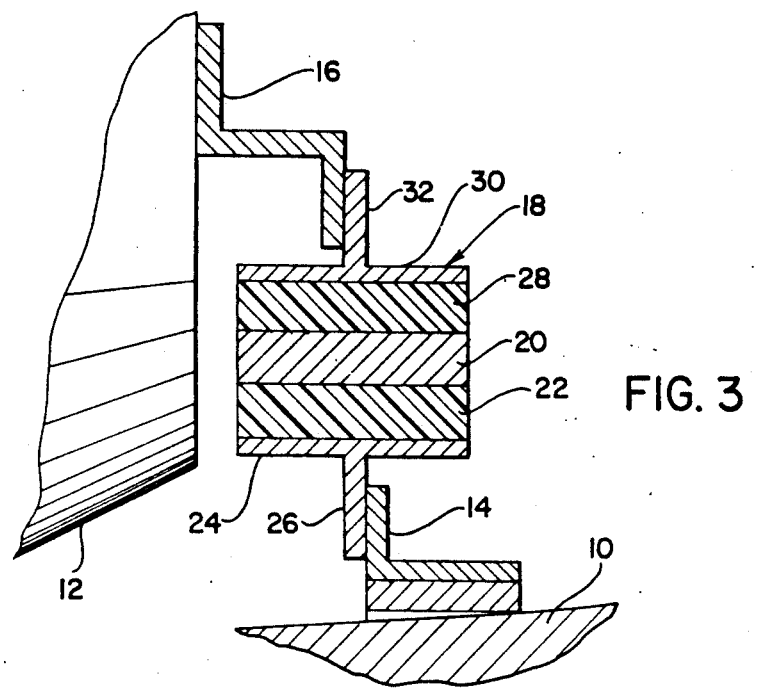
FIG. 3 is an enlarged sectional view of the portion of the assembly illustrated in section in FIG. 1.

The mounting assembly 18 comprises a plurality of concentric rings, the centermost of which is indicated at 20, annular ring 20 being preferably formed of a steel material. While assembly 18 is generally a low frequency isolator, ring 20 acts as an intermediate mass thereby increasing the vibration isolation capabilities of the assembly at higher frequencies. Bonded to the annular central steel ring 20 is an outer annular layer of foam material 22 formed of a polyurethane material. The adhesive for bonding all such foam material to metal is preferably a Miller-Stevenson Co. epoxy adhesive #907 but any other cyano-acrylate adhesive may also be used. The polyurethane foam as used in ring 22 is preferably formed of PORON cellular urethane No. 4701-05 as manufactured by Rogers Corporation or the 16 like. Bonded to the outer surface of the foam layer 22 is an outer annular aluminum ring 24 on which is formed an annular flange 26. As shown in FIG. 3, the annular flange 26 is bonded directly to the annular mounting bracket 14.

Also bonded to the annular central steel ring 20 is a second annular ring of foamed polyurethane 28 formed of PORON cellular urethane. Bonded to the annular ring of polyurethane 28 is a second annular aluminum ring 30 to which an annular flange 32 is joined. As further shown in FIG. 2, annular flange 32 is joined to stand-off flange member 16 that encircles the shaft of the motor 12. Thus, it is seen that the mounting assembly 18 is fixed between the motor 12 and the shell 10, and as will be described provides for the absorbing of low frequency vibrational energy as produced by the motor and that tends to be transferred to the shell 10 during the operation of the torpedo.

The annular foam polyurethane rings 22 and 28 provide an extremely soft sponge area that is distributed over a relatively large expanse. The soft spongy polyurethane rings further are capable of supporting sizeable static loads as are experienced by a load represented by the motor 12. In addition, the polyurethane foam material possesses the characteristic of absorbing a large amount of energy, and therefore acts to absorb or attenuate the low frequency vibrational energy that is produced by the motor during the operation thereof. In this connection, it has been determined that use of the subject invention has produced a reduction of 22 dB at 50 Hz, 33 dB at 100 Hz and 40 dB at 200 Hz. Previous attempts in the use of mounting means for similar types of torpedo motors have not been able to obtain a degree of isolation at frequencies lower than 1000-2000 Hz. Thus, the present invention represents an order of magnitude reduction in the frequencies where substantial isolation begins. It is also seen that the annular construction of the assembly 18 provides the surface area required for isolating the frequency vibrational energy, while distributing the load of the motor 12 over the total volume of the foam, thus producing the maximum isolation that is obtainable in the assembly.

It is understood that the mounting assembly 18 can be modified to accommodate various types and designs of motors or other forms of machinery that would induce low frequency vibrational energy. The choice of the elastomer foam material that would be used in connection with any modified forms of the invention and the dimensional characteristics thereof would necessarily be designed in accordance with the use of a particular device and the weight and vibration characteristics thereof.

Figure 4:
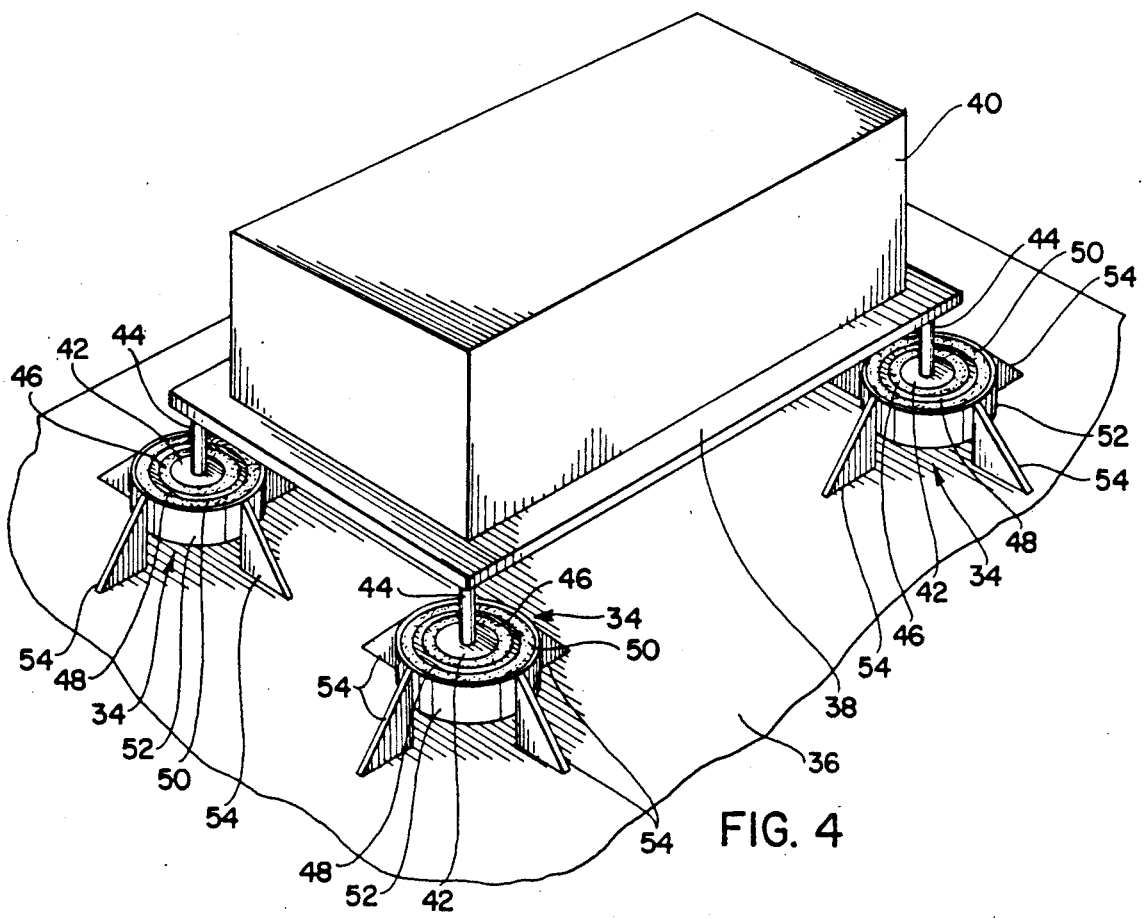
FIG. 4 is a perspective view illustrating a modified use of the subject invention.

Referring now to FIG. 4, a modified form of the invention is illustrated, wherein a plurality of assemblies generally indicated at 34 are shown secured to a base member 36. The assemblies 34 could be used in various orientations, and in the form of the invention illustrated in FIG. 4 are designed to support a mounting plate 38 on which a source 40 of low frequency vibrational energy is located. Each of the assemblies 34 include an inner ring 42 of aluminum material to which a central shaft 44 is secured for supporting the mounting plate 38. Located in concentric relation around the inner aluminum ring 42 is a ring of polyurethane 46 that is preferably formed of PORON cellular urethane manufactured by Rogers Corporation. It is understood, of course, that other urethane materials may also be used as the circumstances demand. Encircling the polyurethane ring 46 is a steel ring 48, and located in concentric relation with respect to the steel ring 48 is an outer polyurethane ring 50 also formed of PORON. Finally, adhesive-bonded assembly 34 includes an outer aluminum ring 52 to which mounting flanges 54 are secured, the mounting flanges 54 being fixed to the base member 36. It is seen that the assemblies 34, which are located beneath the corners of the mounting plate 38, provide a concentric ring structure having a soft spongy polyurethane material distributed over a sufficient area to support the static loads represented by the mounting plate 38 and the source 40 of low frequency vibrational energy. Further, the polyurethane rings possess the characteristic of absorbing a large amount of energy, thereby effectively isolating the base member 36 from the source 40 and absorbing the low frequency vibrational energy as produced by the source 40.

Other variations of the assembly for absorbing low frequency vibrational energy are contemplated, and in light of the above, it is therefore understood that within the scope of the appendant claims, the invention may be practiced otherwise than as specifically described.

What is claimed is:

1. A mounting assembly for absorbing low frequency vibrational energy as produced by a source that is mounted to a base member, comprising:

a central metallic ring member having inner and outer cylindrical surfaces of preselected diameter;

a first non-metallic foam ring having inner and outer cylindrical surfaces, said inner cylindrical surface thereof being fixedly attached to said outer surface of said central metallic ring member in concentric relation with respect thereto;

a second non-metallic foam ring having inner and outer cylindrical surfaces, said outer cylindrical surface thereof being fixedly attached to said inner surface of said central metallic ring member in concentric relation with respect thereto;

an inner metallic ring member having inner and outer cylindrical surfaces, said outer cylindrical surface thereof being fixedly attached to said inner cylindrical surface of said second foam ring in concentric relation with respect thereto;

an outer metallic ring member having inner and outer cylindrical surfaces, said inner cylindrical surface thereof being fixedly attached to said outer cylindrical surface of said first foam ring in concentric relation with respect thereto;

inner mounting means interconnecting said inner metallic ring member to said source of low frequency vibrational energy; and outer mounting means interconnecting said outer metallic ring member to said base member;

wherein said cylindrical foam rings absorb the vibrational energy as produced by said source of low frequency vibrational energy for substantially isolating said base member therefrom.

2. A mounting assembly as claimed in claim 1, said first and second non-metallic foam rings being formed of a material comprising polyurethane.

3. A mounting assembly as claimed in claim 2, said central metallic ring being formed of a metallic material comprising steel.

4. A mounting assembly as claimed in claim 3, said inner and outer metallic ring members being formed of a metallic material comprising aluminum.

5. A mounting assembly as claimed in claim 4 wherein said source of low frequency vibrational energy is an electrically energized motor.

6. A mounting assembly as claimed in claim 4, said aluminum inner and outer ring members having inner and outer radially extending flanges formed thereon respectively, the inner flange of said inner ring member being interconnected to said source, and the outer flange of said outer ring member being interconnected to said base member.

7. A mounting assembly as claimed in claim 6, at least one other of said mounting assemblies being interconnected to said source and to said base member for attenuating low frequency vibrational energy as produced by said source for isolating said base member therefrom.

8. A mounting assembly as claimed in claim 1, said base member being defined by a cylindrical shell member within which said assembly and said source of said low frequency vibrational energy are mounted.

* * * * *